(12) United States Patent
Clevenger et al.

(10) Patent No.: US 7,543,236 B1
(45) Date of Patent: Jun. 2, 2009

(54) SYSTEM AND METHOD FOR REPLACING APPLICATION PUBLISHER INTERFACE BRANDING WITH IDENTITY PLATES

(75) Inventors: Christopher Clevenger, San Francisco, CA (US); Jon Steinmetz, Stillwater, MN (US)

(73) Assignee: Adobe Systems Incorporated, San Jose, CA (US)

( * ) Notice: Subject to any disclaimer, the term of this patent is extended or adjusted under 35 U.S.C. 154(b) by 281 days.

(21) Appl. No.: 11/445,011

(22) Filed: Jun. 1, 2006

(51) Int. Cl.
  *G06F 3/00* (2006.01)
  *G06F 9/00* (2006.01)
  *G06F 17/00* (2006.01)

(52) U.S. Cl. .................. 715/744; 715/762; 715/763; 715/731

(58) Field of Classification Search .............. 715/760, 715/762, 763, 764, 780, 861, 707, 731, 744, 715/747, 789, 826
See application file for complete search history.

(56) References Cited

U.S. PATENT DOCUMENTS

| | | | |
|---|---|---|---|
| 5,781,189 A * | 7/1998 | Holleran et al. ............. 715/826 |
| 5,845,281 A * | 12/1998 | Benson et al. ............... 707/9 |
| 7,280,258 B2 * | 10/2007 | Kitahara et al. ............ 358/501 |
| 7,292,369 B2 * | 11/2007 | Yokoyama et al. .......... 358/1.9 |
| 2002/0158902 A1 * | 10/2002 | Hooker et al. .............. 345/744 |
| 2003/0195802 A1 * | 10/2003 | Hensen et al. .............. 705/14 |
| 2004/0036722 A1 * | 2/2004 | Warren ...................... 345/866 |
| 2004/0242322 A1 * | 12/2004 | Montagna et al. ............ 463/29 |
| 2006/0089147 A1 * | 4/2006 | Beaty ......................... 455/445 |
| 2006/0129417 A1 * | 6/2006 | Williams et al. .............. 705/1 |
| 2006/0224981 A1 * | 10/2006 | Bushey et al. ............... 715/762 |

\* cited by examiner

*Primary Examiner*—Tadesse Hailu
*Assistant Examiner*—Anita D Chaudhuri
(74) *Attorney, Agent, or Firm*—Robert C. Kowert; Meyertons, Hood, Kivlin, Kowert & Goetzel, P.C.

(57) ABSTRACT

Identity plates are described, including importing identity data into an application, the identity data being used to configure one or more identity elements, configuring an identity plate using the one or more identity elements, and presenting the identity plate within an interface associated with the application, the identity plate being configured to display the one or more identity elements in one or more associated positions configured to receive the one or more identity elements.

20 Claims, 11 Drawing Sheets

SYSTEM AND METHOD FOR REPLACING APPLICATION PUBLISHER INTERFACE BRANDING WITH IDENTITY PLATES

FIELD OF THE INVENTION

The present invention relates generally to software architecture. More specifically, identity plates are described.

BACKGROUND OF THE INVENTION

Computer programs, software or applications ("applications") use graphical user interfaces ("interfaces") to display information and data to users, enabling functionality and features to be used in a productive and efficient manner. Elements such as graphics, icons, text, and colors may be employed by users to provide for different and individualized user experiences. However, conventional UIs and interfaces are often limited to the application developer or publisher's "look-and-feel" and personalization or customization of an interface is limited, if allowed at all.

Some conventional applications are limited due to little or no ability to individually or personally modify the appearance, content, or context of an interface. For example, office productivity (e.g., word processing, accounting, spreadsheet, project management, and the like) applications have interfaces that are fixed by the developer or publisher ("publisher"), thus preventing users from customizing individual instances of an application. Other conventional applications use "skins," which provide pre-set interface environments. However, "skins" are cosmetic in appearance, providing different colors, fonts, typeset, and other display parameters.

Still other conventional applications provide for the use of previously entered registration data, which is displayed in a limited set of areas intended to provide a customized appearance, but failing to integrate with any functionality of an application. Yet other conventional applications are used as tools that allow modification or customization of an interface, but limited only to output generated by an application. In other words, presentation, visual or graphics design, and computer aided design ("CAD") applications allow customization, but only for files, data, objects, drawings, designs, or other output models ("output models") generated using these applications. Thus, a solution for customizing interfaces without the limitations of conventional techniques is needed.

BRIEF DESCRIPTION OF THE DRAWINGS

Various examples are disclosed in the following detailed description and the accompanying drawings.

DETAILED DESCRIPTION

Various embodiments or examples may be implemented in numerous ways, including as a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided as examples and the described techniques may be practiced according to the claims without some or all of the accompanying details. For clarity, technical material that is known in the technical fields related to the embodiments has not been described in detail to avoid unnecessarily obscuring the description.

Identity plates are described, including identity data and identity elements that, when used, provide customized branding or personalized elements ("identity elements") within an interface. Identity elements may include logos, graphics, text, audio, video, or other forms of content that may be customized by a user to replace branding or other identity elements, including those provided by application publishers or developers. In some examples, identity plates may include pre-determined sets of data that determine identity elements, parameters for how and where the identity elements are to be displayed, locations for displaying the identity elements within an interface, and other characteristics that may be used to couple an identity plate with a specific set of functionality, content, or other application data. Various examples are provided below for descriptive purposes, but are intended to be neither limiting nor completely comprehensive.

Figure 1:
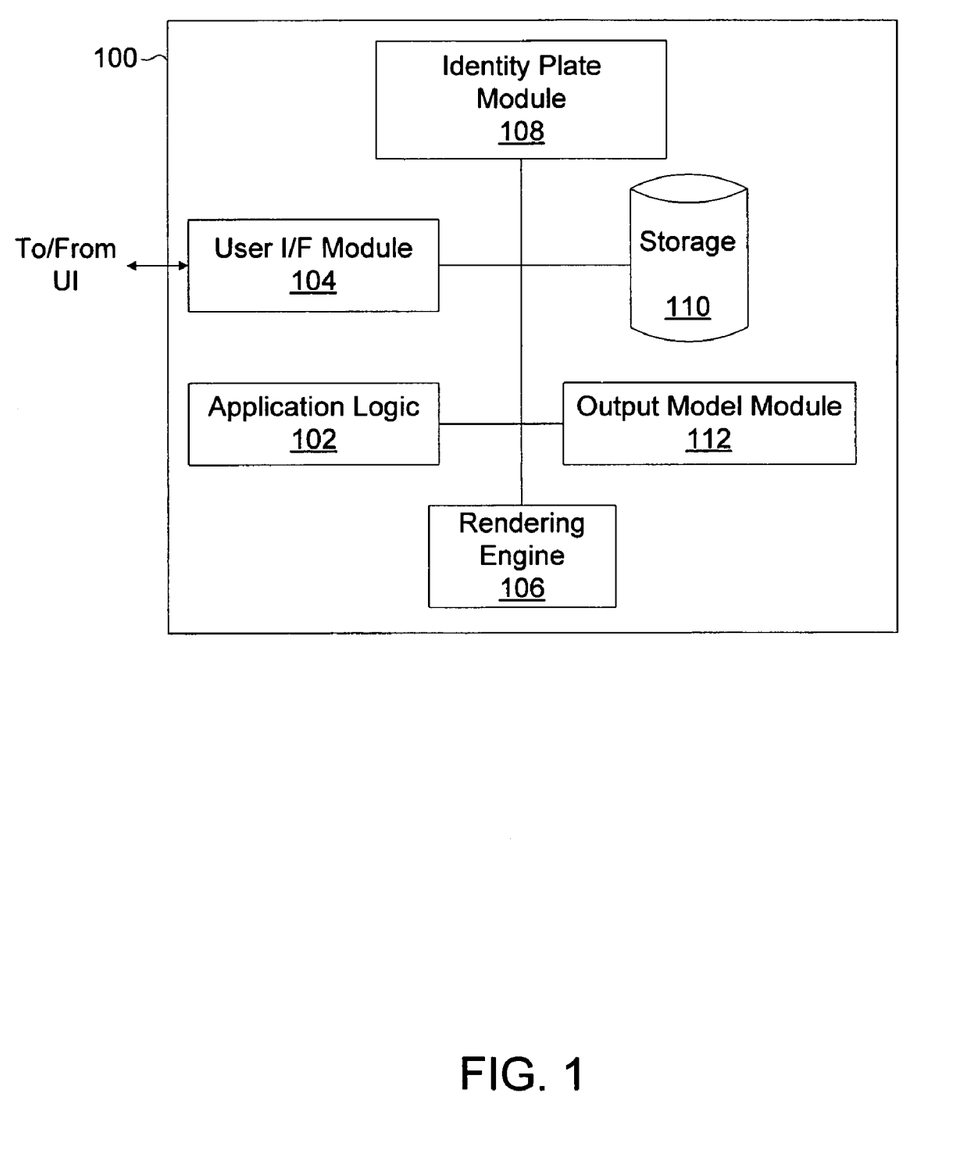
FIG. 1 illustrates an exemplary identity plate system.

FIG. 1 illustrates an exemplary identity plate system. Here, system 100 includes application logic 102, user interface module 104, rendering engine 106, identity plate module 108, storage repository 110, and output model module 112. In some examples, techniques for implementing identity plates may be included within an application. In other words, system 100 may be an application that includes functionality for implementing identity plates (e.g., identity plate module 108). Here, identity plate module 202 and application logic 102 may be included within system 100 as part of an application. Application logic 102 may include logic such as computer instructions or program code that, when executed, performs the described techniques. Application logic 102 may also be logic that executes an application within which identity plates may be used or implemented. For example, application logic 102 may be used to execute logic for an office productivity application for word processing, document formatting, presentation, spreadsheet, or other purposes. An application, as directed by application logic 102, may be used to implement a variety of computer environments that may include an identity plate using the techniques described herein. Application logic 102, applications, computer programs, or code may be developed and implemented using various types of structured or unstructured programming and formatting languages such as Objective C, C, C++, C#, Lua, .Net, Java, Cobol, FORTRAN, ADA, HTML, XML, XHTML, and others. The types of programming or formatting languages used are not intended to be either limiting or comprehensive and may be varied.

In some examples, user interface module 104 enables system 100 to send and receive data to a user interface (not shown). When user input is received, user interface module 104 may receive the information and forward it to application logic 102, identity plate module 108, or other modules within system 100 to use when implementing identity plates. For example, if a user indicates that an identity plate is desired for inclusion on a given page of an application being used ("application-in-use") by a user, information and data may be sent by the user to system 100 that provides parameters on how, where, and when to display the identity plates. Further, the user may specify one, some, or all portions of a user interface in order to customize the appearance or "brand" the "look-and-feel" of the application. Branding of an application allows a user to, in some examples, to replace branding or personalization elements of an application with his or her own identity elements in order to provide the appearance of a personally branded application. For example, if a photographer/user is using an application to digitally present, modify, edit, or otherwise work with images, an application may have the initial appearance and branding of that of the application publisher (i.e., an individual developer or development entity that developed the application). The photographer/user can input information that allows him to replace the publisher's branding with an identity plate. In some examples, an identity plate may be a pre-determined set of logos, text, graphics, display icons, or other content that provide an online "identity" ("identity elements") for a user. When implemented, the identity plate replaces a publisher's or otherwise pre-existing logos, text, graphics, or other display elements with the identity elements belonging to the identity plate. In the above example, the photographer/user may then use the application to demonstrate a professional appearance when modifying, editing, displaying or otherwise working with a set of images and a customer. The customer may view the application with the implemented identity plate and instead of seeing the publisher's branding, instead views the photographer/user's branding. In other examples, different applications may be used for different types of contexts, which may provide various types of user experiences and branding. Instead of using fixed branding or advertising content (e.g., logos, graphics, tile and banner advertisements, and other commercial content placed by an advertising or marketing entity), an individual user can brand an application "on-the-fly" or immediately, enabling him to use the application as a visual representation or extension of his workplace for the benefit of enhancing brand awareness and identity perception for customers.

Identity plates, identity elements, and associated data ("identity data") may be stored in storage 110. Storage 110 may be a local or remote repository, database, data warehouse, storage area network, storage array (e.g., RAID, and others), network attached storage (i.e., NAS), or other type of storage facility. Various types of data schemas (e.g., MySQL, Oracle, DB2, and others) may be used with storage 210, which is not limited to any particular data storage schema. In some examples, identity plate module 108 may, when directed by a user as indicated by user input received via user interface module 104, direct the retrieval of an identity plate, identity elements, and identity data from storage 110. Once retrieved, output models (i.e., how identity elements belonging to an identity plate are to be displayed) are generated by output model module 112 and rendered on a display (e.g., a user interface (not shown)) by rendering engine 106 via user interface module 104. In other examples, system 100 and the above-described components may be varied in design, function, and implementation and are not limited to the examples described above.

Figure 2:
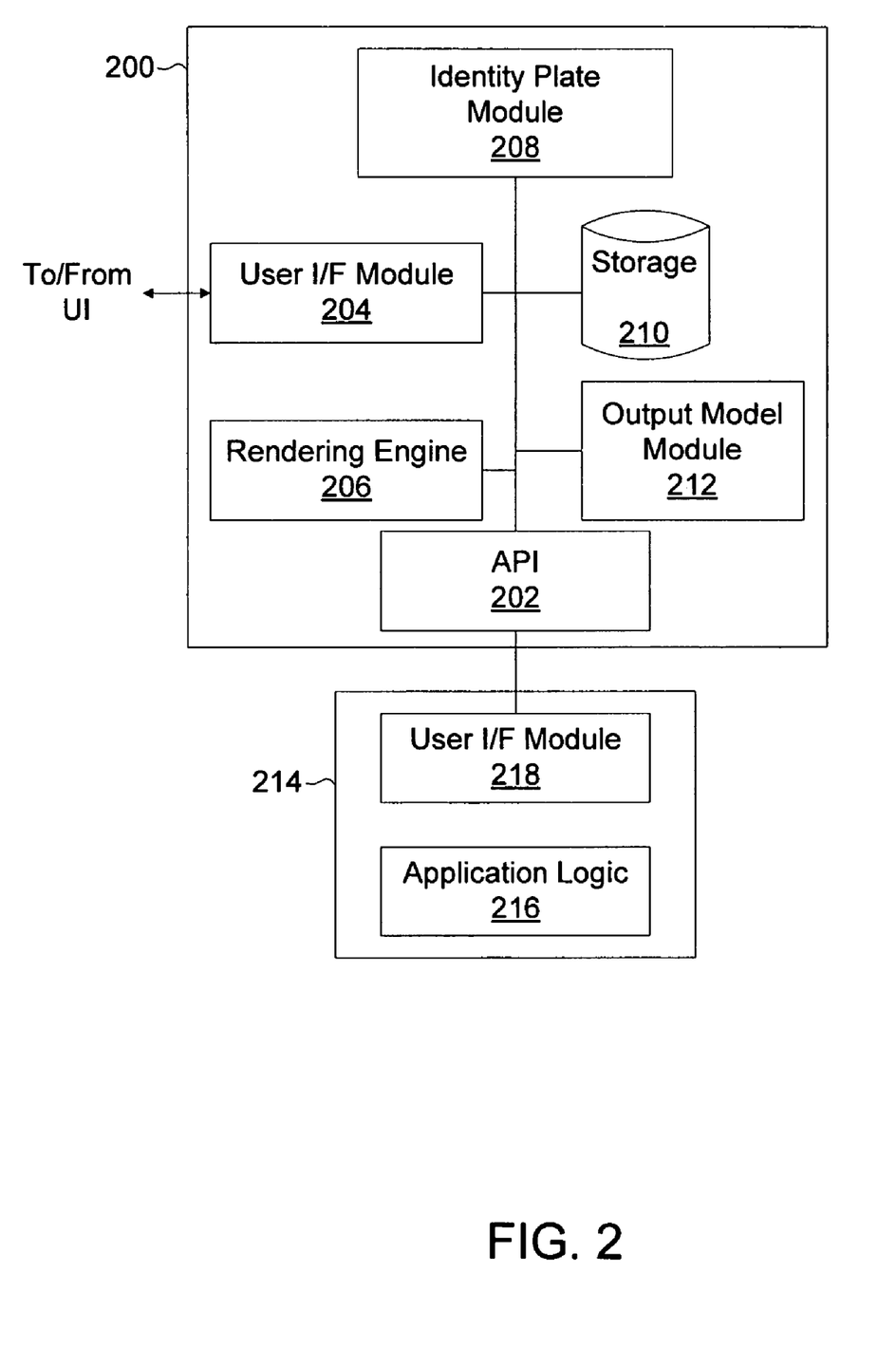
FIG. 2 illustrates an alternative exemplary identity plate system.

FIG. 2 illustrates an alternative exemplary identity plate system. Here, system 200 includes application programming interface ("API") 202, user interface module 204, rendering engine 206, identity plate module 208, storage 210, and output model module 212. In some examples, system 200 and application programming interface 202, user interface module 204, rendering engine 206, identity plate module 208, storage 210, and output model module 212 may be implemented similarly to the above-described components in connection with FIG. 1. Alternatively, API 202 may be used to provide data communication with application 214 and application logic 216. In some examples, identity plate functionality may be implemented apart from an application. Here, application 214 may be implemented apart from identity plate module 208. In other words, identity plate module 208 may be implemented on system 200, which may be on, for example, an operating system, a portion of a memory on a computer, or a separate computer apart from that on which application 214 is installed. In some examples, a server may be used to implement application 214 while system 200 may be implemented on a client. In other examples, application 214 may be implemented on a peer (e.g., a desktop or notebook computer or server) and system 200 may be implemented on a different peer (i.e., another desktop or notebook computer or server in data communication with the first peer). In still other examples, different types of distributed implementation environments may be used to implement system 200 and application 214. User input provided via user interface modules 204 and 218 may be used to exchange information or data with system 200 and application 214, respectively. Identity plate module 208 may, when implemented on a separate computer or processor-based environment, install identity elements on an application that is installed on either the same system (e.g., system 100 (FIG. 1)) or in a different operating environment (e.g., remote computer or server in data communication with system 200). In some examples, "remote" may refer to a separately configured and installed computer that is implemented apart from another separately configured and installed computer, but which may be in data communication with each other. "Computer" may also refer to any type of computing device, including a desktop, notebook or laptop, server, personal computer, mobile computing device, personal digital assistant, smart phone, camera phone, cell phone, and others. As an example, application 214 may be an office productivity application having an interfacing displaying various icons, tools, menus, and other graphical, video, audio, and text-based content. A user may select an option from the interface associated with application 214 (not shown). When selected, an option may retrieve an identity plate from system 200 using identity plate module 208. In some examples, one or more identity plates, identity elements, and identity data may be stored on storage 210. In some examples, an identity plate may include a list or table of pointers to data within storage 210 that identifies identity elements that are to be retrieved and implemented when a given identity plate is selected. Table 1 illustrates an example of a table to retrieve identity plates, identity elements, and identity data from databases stored on storage 210:

| Identity Plate Name | Identity Elements | Database |
| --- | --- | --- |
| Identity Plate 2 | Graphic A, Icon B, Text C | USE identity1 |
| Identity Plate 3 | Graphics B-E, Icon C | USE identity2 |
| Identity Plate 4 | Icons D-G, Text D | USE identity3 |
| Identity Plate 5 | Graphic | USE identity4 |

In other examples, identity plates, identity elements, and identity data may be stored in storage 210 differently using other database schemas and formats, which are not limited to the examples shown or described. In still other examples, system 200, application 214, and the above-described components may be varied in design, function, and implementation and are not limited to the examples shown or described.

Figure 3A:
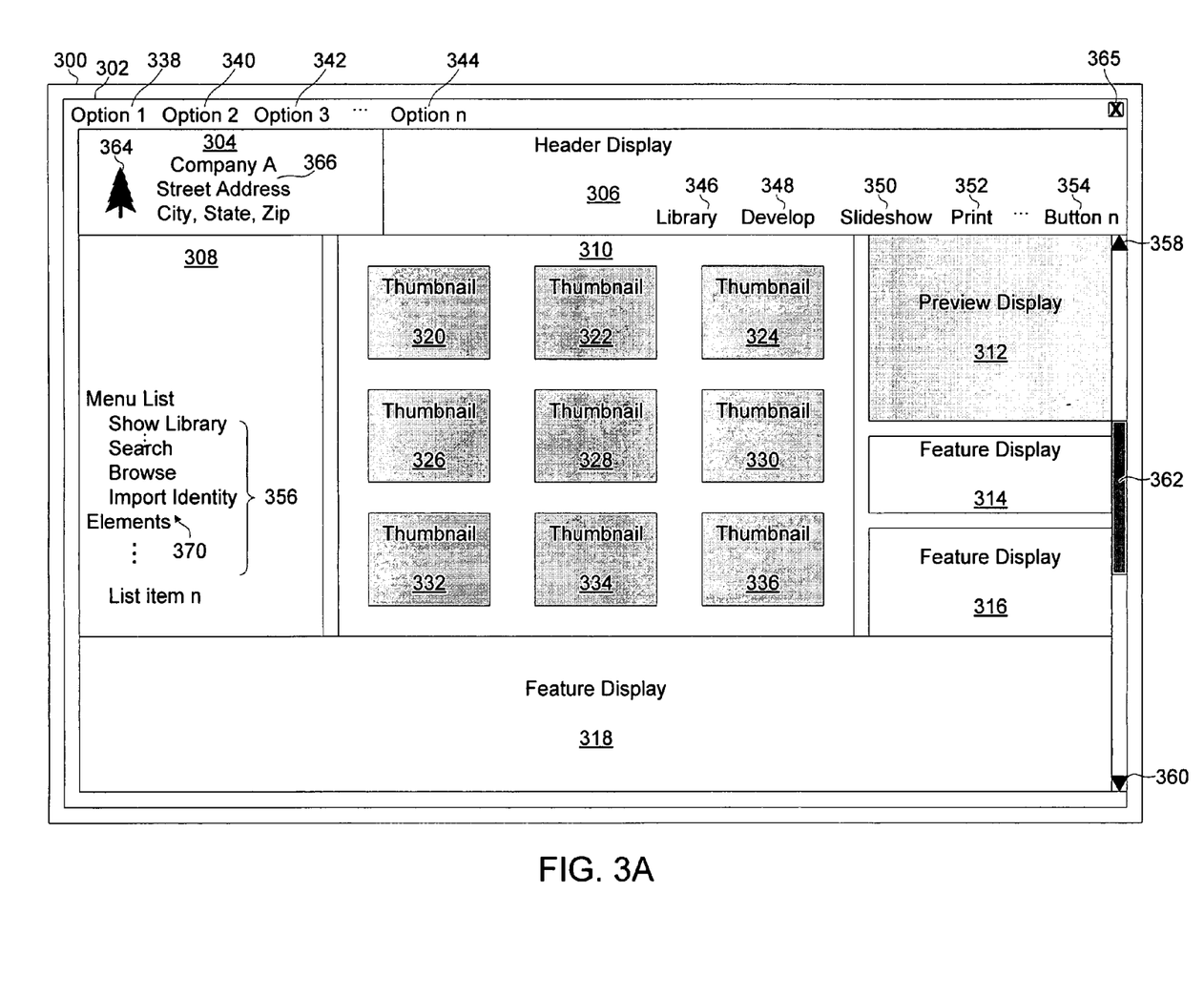
FIG. 3A illustrates an exemplary identity plate interface.

FIG. 3A illustrates an exemplary identity plate interface. Here, interface 300 includes display 302, region 304 of header display area 306, left display area 308, center display area 310, preview display area 312, and feature display areas 314-318. Within center display area 310, thumbnails 320-336 are shown. When one of thumbnails 320-336 is selected, preview display area 312 may be used to show a larger version of the selected image. Other tools, options, and actions may be employed by a user when working with images represented by thumbnails 320-336. As an example, menu options 338-354 may be employed to perform certain tasks associated with interface 300. In some examples, an option may be provided using one or more of menu options 338-354 to provide an option for implementing an identity plate to brand interface 300. In other examples, options may be used differently. Options may also be listed as item in menu 356, which may be used to present various options for a user to select when working with interface 300. In still other, scrolls arrows 358-360 and scroll bar 362 may be used to manipulate content displayed in left display area 308, center display area 310, preview display area 312, and feature display areas 314-318. In region 304, branding elements 364-366 are shown. In this example, branding elements 364-366 represent a logo (i.e., a tree) and text that is associated with "Company A," which may be a publisher of the application associated with interface 300.

In some examples, branding elements 364-366 may be replaced using an identity plate. Selecting one or more of options 338-354 or choosing a listed item from menu 356 (e.g., option 370 ("Import Identity Elements")) may allow a user to brand interface 300 using one or more identity plates, identity elements, and identity data. For example, selecting option 370 ("Import Identity Elements") from menu 356 enables a user to select and import an identity plate or identity elements into interface 300 to replace branding elements 364-366. In other examples, identity plates, identity elements, and identity data may be implemented in interface 300 differently and are not limited to the examples shown and described.

Figure 3B:
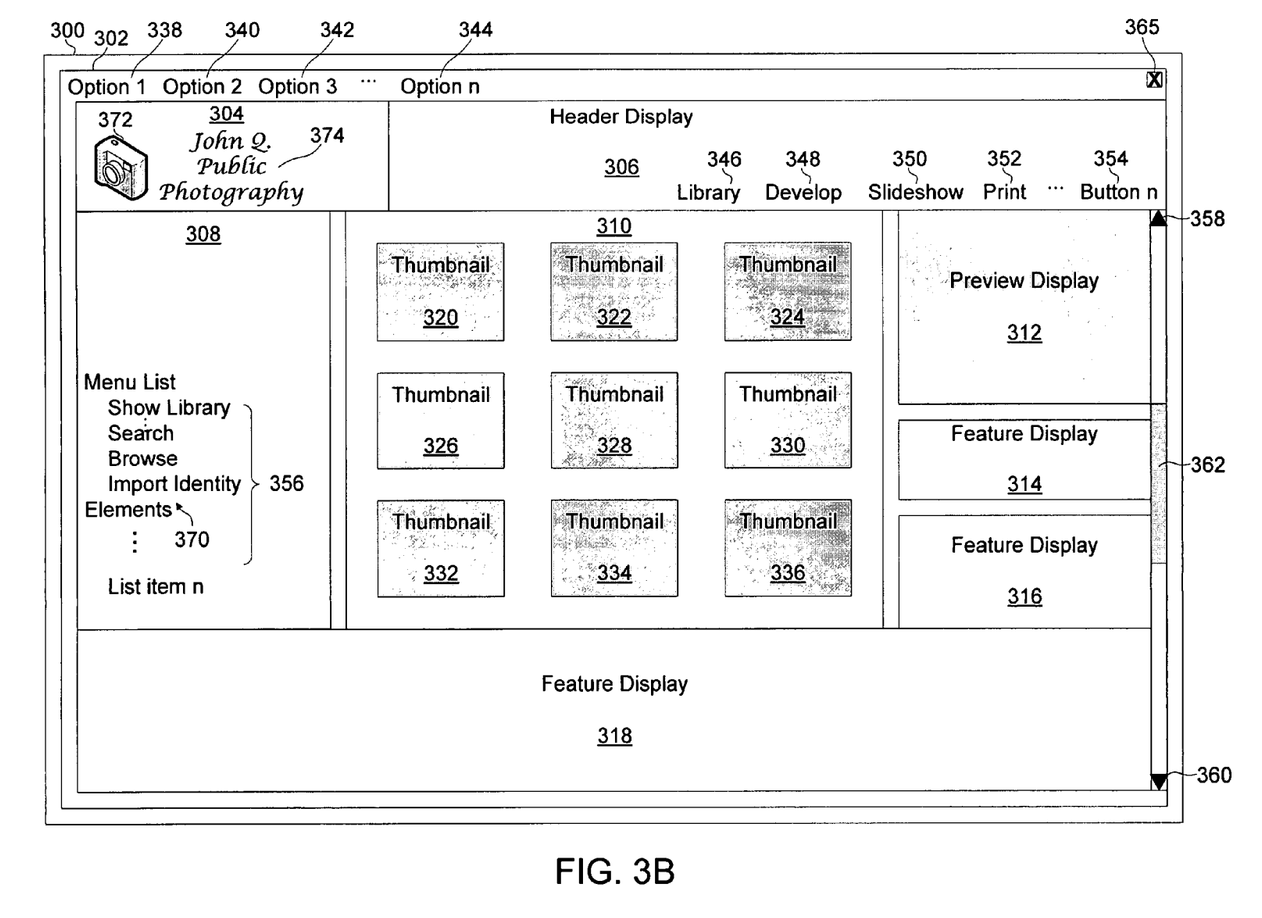
FIG. 3B illustrates an exemplary identity plate interface presenting an identity plate.

FIG. 3B illustrates an exemplary identity plate interface presenting an identity plate. Interface 300 and elements 302-370 are described above in connection with FIG. 3A. Here, an example of using an identity plate to replace branding elements 364-366 is shown. Identity elements 372-374 have been implemented in region 304. In some examples, identity elements 372-374 may be selected and implemented as part of an identity plate selected by a user to replace branding elements 364-366. As described above, an identity plate, identity elements, and identity data may be selected using menu options 338-354, menu 356, or other interface tools. In other examples, identity elements 372-374 may be implemented differently and are not limited to the design, function, or implementation examples described above.

Figure 3C:
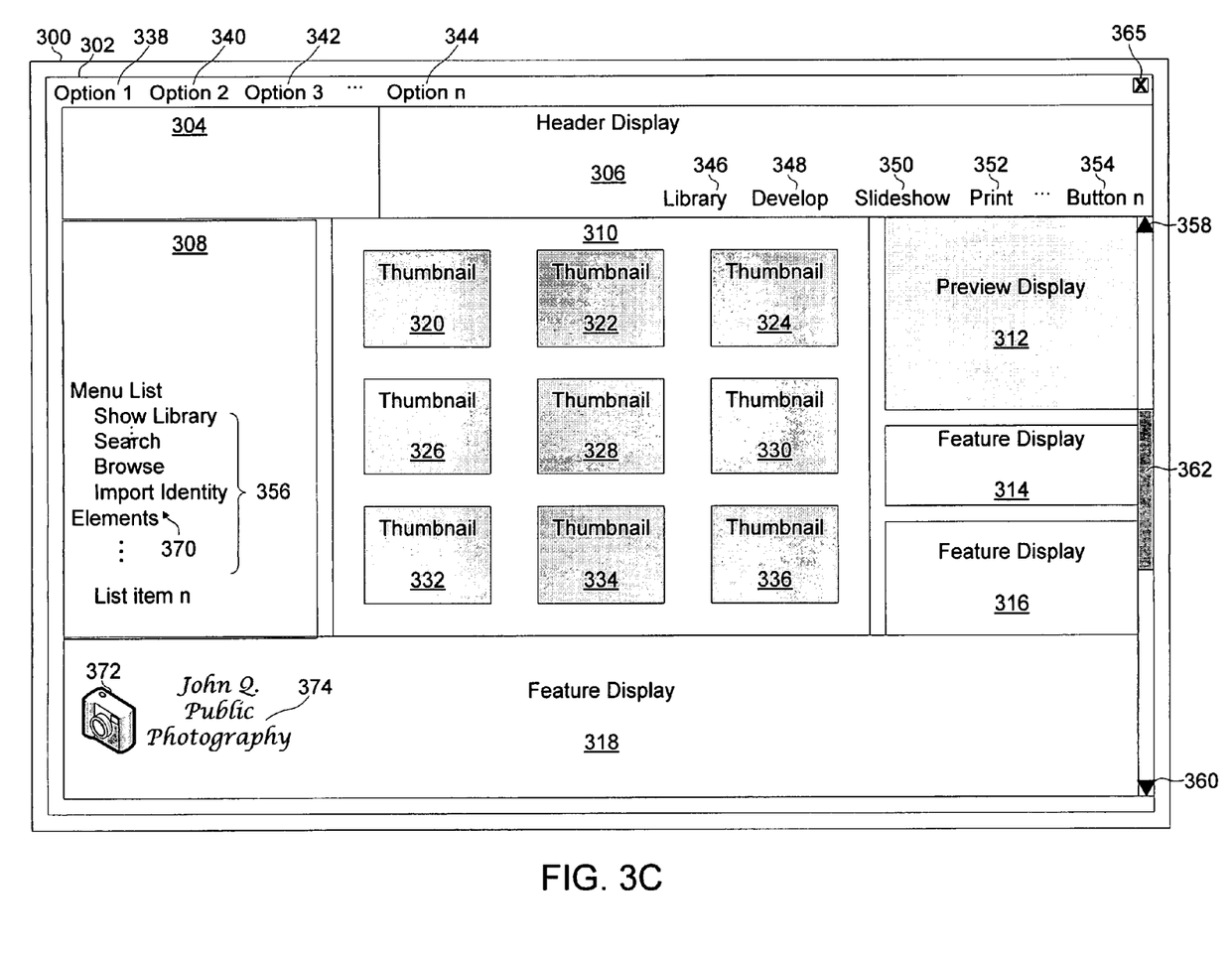
FIG. 3C illustrates an alternative exemplary identity plate interface presenting an identity plate.

FIG. 3C illustrates an alternative exemplary identity plate interface presenting an identity plate. Interface 300 and elements 302-370 are described above in connection with FIG. 3A. Here, an alternative example of using an identity plate to replace branding elements 364-366 is shown. Identity elements 372-374 that may be part of an identity plate have been implemented in feature display area 318. In other examples, identity elements 372-374 may be implemented in different display areas, regions, windows, or other portion of interface 300. In still other examples, identity elements 372-374 may be implemented in areas beyond those shown and described. As another example, an identity plate may be implemented by "clicking and dragging" a logo, graphic, icon, text, or other visual element from a selection to a portion of interface 300. When the visual element is "released" or dragged to the desired portion of the screen, the identity plate is implemented, installing logos, graphics, text, and other content associated with identity elements and identity data into the indicated areas. In some examples, user, publisher, or application-set parameters may prevent installing identity plates, identity elements, and identity data into parts of interface 300 that may affect functionality or are otherwise not permitted. Rules, parameters, or other pre-determined conditions may prevent an identity plate from installation in certain areas of interface 300. In other examples, identity plates may be installed in any portion of interface 300. By selecting an identity plate, a user may identify and instruct an application or logic (e.g., identity plate module 108) to replace branding elements 364-366 of the publisher. Interface 300 and the above-described elements 302-374 may be varied in design, function, and implementation and are not limited to the examples shown and described.

Figure 3D:
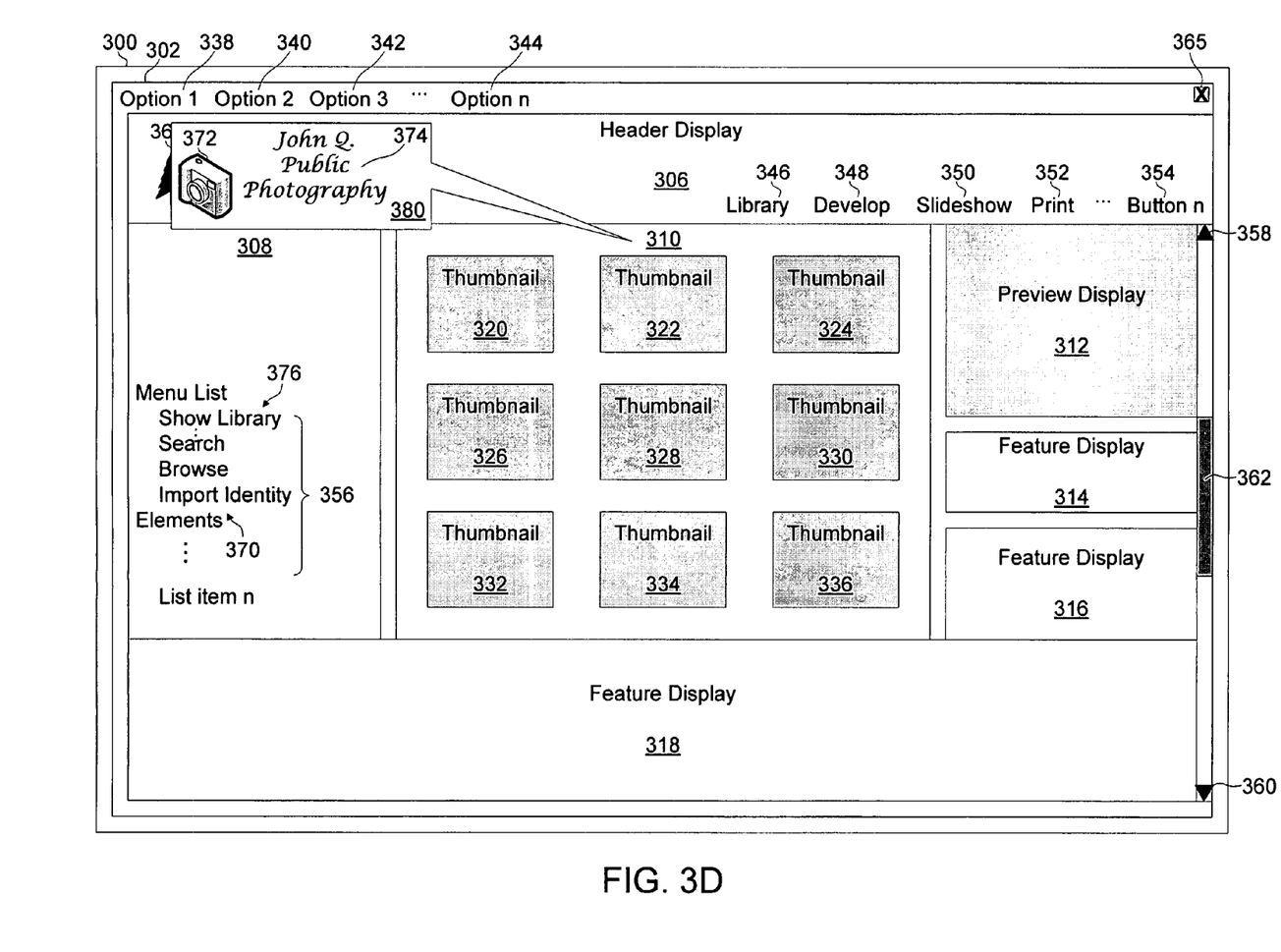
FIG. 3D illustrates another alternative exemplary identity plate interface presenting an identity plate.

FIG. 3D illustrates another alternative exemplary identity plate interface presenting an identity plate. Here, another example is shown of how identity elements may be implemented within interface 300. In some examples, instead of replacing branding elements 364-366, pop-up display 380 may be used with identity elements 372-374. When a given selection of content belonging to a particular user is shown, an identity plate associated with the selected content may be implemented in pop-up display 380. Here, pop-up display 380 includes identity elements 372-374, which may represent the photographer associated with the images taken and represented by thumbnails 320-336. In other examples, interface 300 and the above-described elements 302-380 may be varied in design, function, and implementation and are not limited to the examples shown and described above.

Figure 3E:
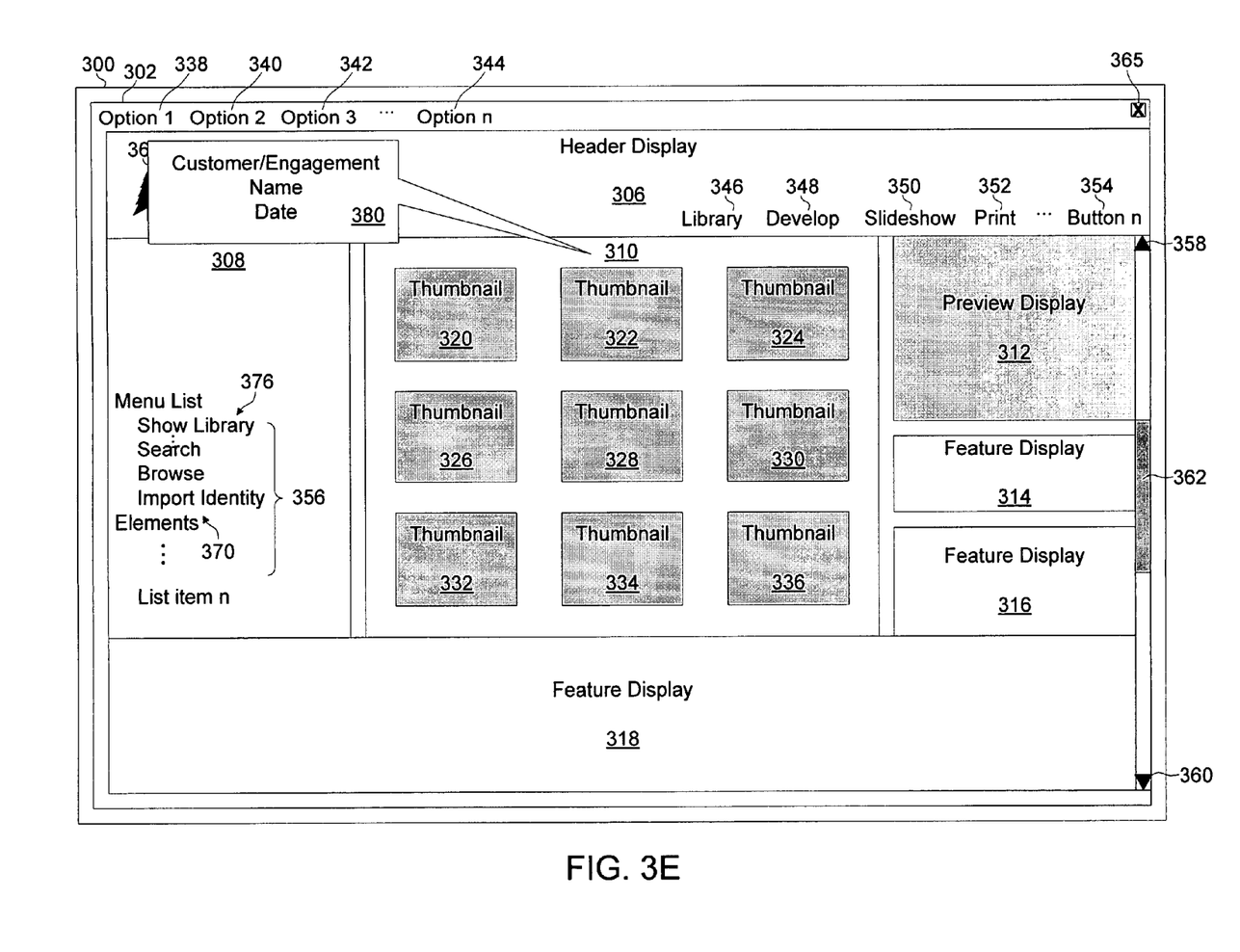
FIG. 3E illustrates yet another alternative exemplary identity plate interface presenting an identity plate.

FIG. 3E illustrates yet another alternative exemplary identity plate interface presenting an identity plate. Here, interface 300 is shown including an example of pop-up display 380 that may be used to present an identity plate, identity elements, and identity data. In some examples, pop-up display 380 may be used to represent customer/engagement, name, date, and other information for branding interface 300. The information shown in pop-up display 380 may be changed, modified, deleted, added, or supplemented with other information beyond that shown in the example described. For example, information associated with each of thumbnails 320-336 (e.g., file size, date created/taken, customer, and the like) may be displayed in pop-up display 380. In other examples, identity elements such as logos, graphics, video, audio, text, or other forms of content may be implemented by pop-up display 380. In still other examples, interface 300 and the above-described elements 302-380 may be varied in design, function, and implementation and are not limited to the examples shown and described above.

Figure 4:
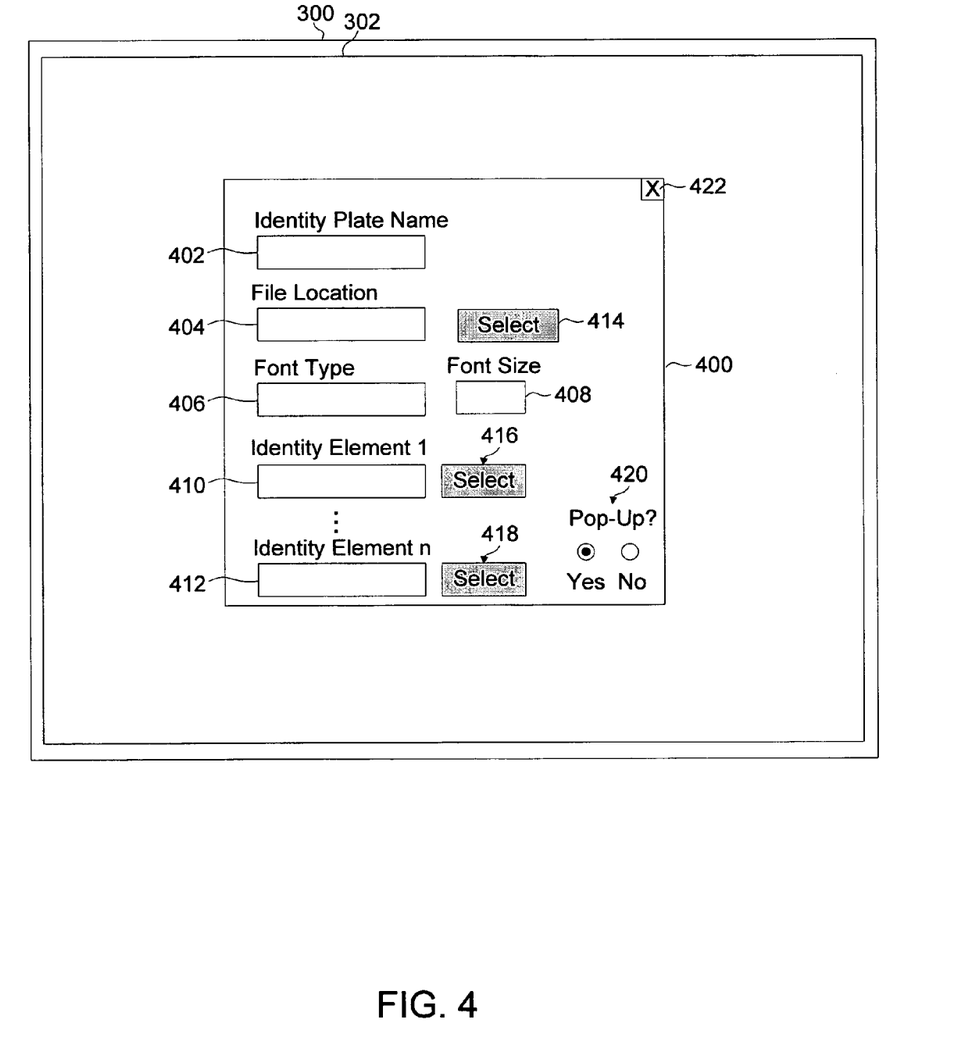
FIG. 4 illustrates an exemplary interface for configuring an identity plate.

FIG. 4 illustrates an exemplary interface for configuring an identity plate. As an example, dialog display 400 may be implemented as a pop-up display (e.g., pop-up display 380 (FIGS. 3D-3E)). Here, dialog display 400 includes identity plate name field 402, file location field 404, font type field 406, font size field 408, identity element fields 410-412, select buttons 414-418, pop-up radio button 420, and close icon 422. In some examples, an identity plate may be configured using dialog display 400 by entering information into various fields that may be used to identify content and parameters for displaying an identity plate. In other examples, identity plates may be configured using different fields, formats, displays, dialogs, or other user interface elements. Configuration of identity plates is not limited to the use of dialog display 400 and other techniques for entering and configuring identity plates may be used.

In the examples described above in connection with FIGS. 3A-3E, identity plates may be implemented with a photography application that allows a photographer/user to personally brand an interface (e.g., interface 300 (FIGS. 3A-3E)) using identity plates that are configured using the techniques described. Here, a user may enter a name for an identity plate in name field 402. The location of a file may be chosen and selected using file location field 404 and select button 414. If text is used with an identity plate, font may be configured using the drop down menu in font type field 406 and entering a size number in font size field 408. If another identity element is desired for display when the identity plate is selected, identity element fields 410-412 may be used. In some examples, more than one identity element may be used and identity element fields 410-412 illustrate any number, n, identity element fields that may be implemented with dialog display 400. Here, identity elements may also be configured for display in a pop-up display (e.g., pop-up display 380 (FIGS. 3D-3E)) using pop-up radio button 420. In other examples, different fields, buttons, functionality, or other selection interface elements may be used to configure an identity plate. Further, identity plate configuration may be varied in design, functionality, and implementation and is not limited to the examples described above.

Figure 5:
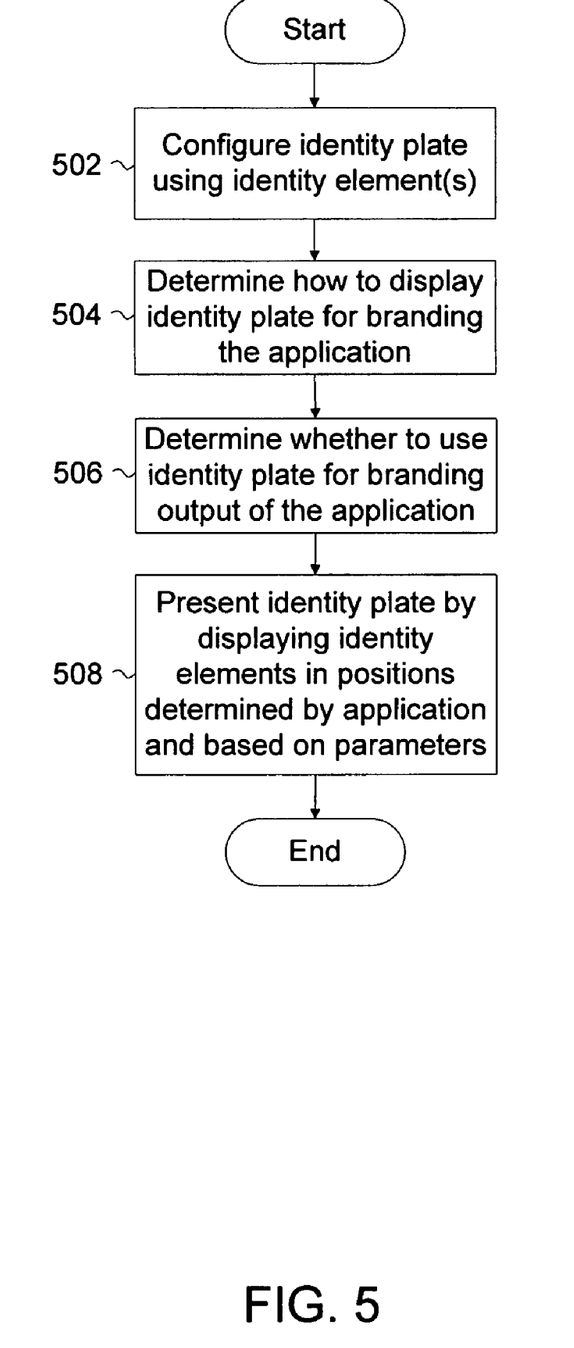
FIG. 5 illustrates an exemplary process for using an identity plate in an application.

FIG. 5 illustrates an exemplary process for using an identity plate in an application. Here, an identity plate is configured using one or more identity elements (502). In some examples, identity plates and identity elements may include identity data, which comprises data and information used to render and display an identity plate in an application interface. Once configured, displaying the identity plate is determined (504). Subsequently, a determination is made as to whether to use an identity plate to also brand the output of an application (506). For example, output of an office productivity solution may involve printing a document, spreadsheet, slide, or the like. Determining whether to brand the output of an application may involve a determination as to whether to brand the document, spreadsheet, slide, or other output from the application in use. In some examples, a user may enter parameters or criteria that may be used to determine how to display an identity plate and whether to brand the output of an application with the identity plate. In other examples, parameters and criteria may be system-specified. Once determinations have been made on how to display an identity plate as well as whether to brand the output of an application, the identity plate is presented by displaying identity elements in pre-determined positions within an interface associated with an application-in-use. For example, if a photographer is using the digital image editing application described above, she may decide to brand the interface and output of the application with her contact information. The photographer may then enter parameters and criteria to enable the photographer's contact information to print on the interface and output of the application. In other examples, the above-described process may be varied and is not limited to the examples provided.

Figure 6:
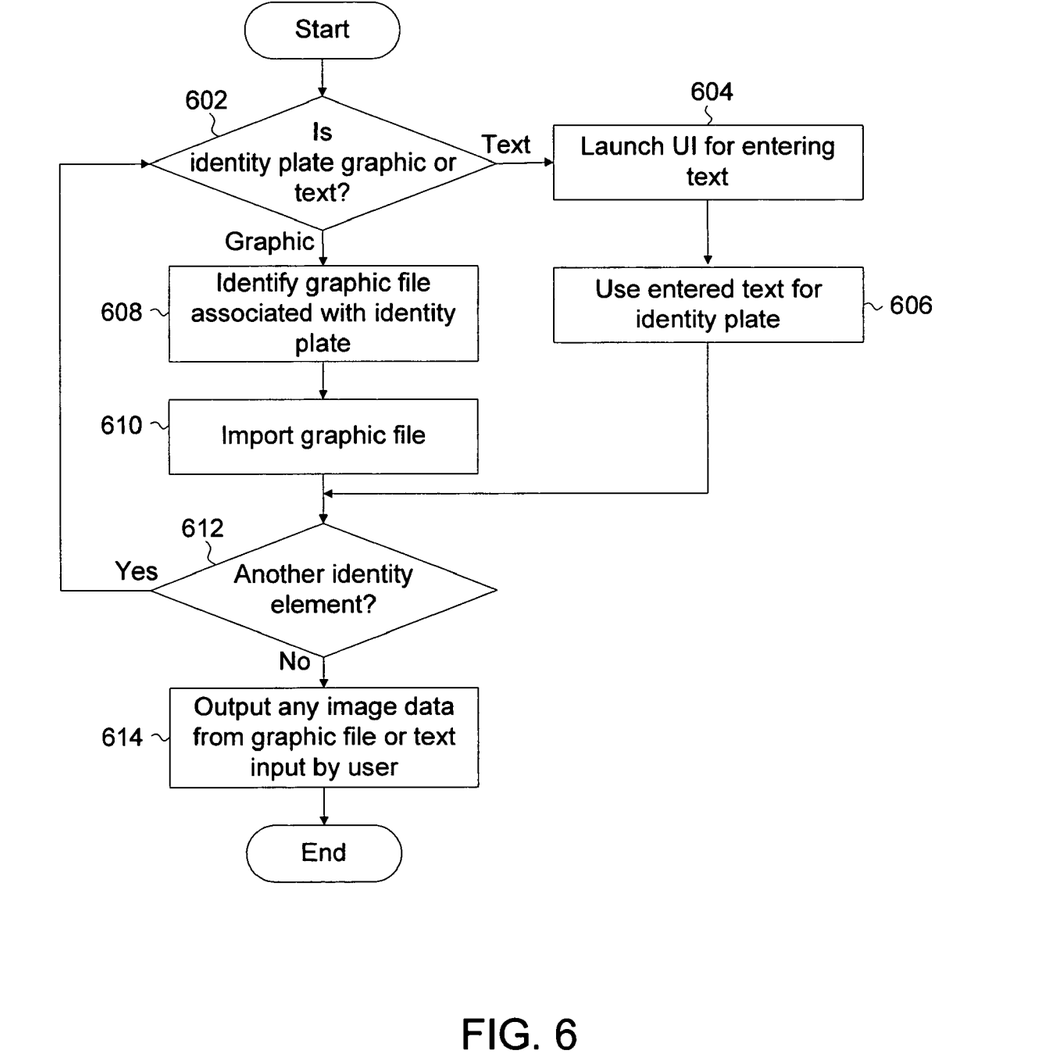
FIG. 6 illustrates an exemplary sub-process for displaying an identity plate.

FIG. 6 illustrates an exemplary sub-process for displaying an identity plate. After determining how to display an identity plate and any associated identity elements and identity data, a determination is made as to whether the identity plate is graphic or text-based (602). If the identity plate is text-based, a user interface is launched to allow the user to enter data that is displayed in an identity plate (604). A user interface displayed to allow a user to enter text may be implemented using a variety of techniques and is not limited to any particular example. For example, a user interface may be another display or sub-display that is presented to the user. If text is entered, then the data associated with the text is used for an identity plate (606). Alternatively, if the identity plate is graphic-based, then a graphic file associated with the identity plate is identified (608). Once identified, the graphic file is imported, which may also include any parameters or other information that may be used to determine how the graphic file is displayed within an identity plate (610). A determination is made as to whether another identity element is associated with the identity plate (612). If another identity element is associated with the current identity plate, then the sub-process repeats and a determination is made as to whether the next identity plate is text or graphic-based (602). However, if there is no further identity elements associated with the current identity plate, then identified graphic files and text are output to the identity plate (614). After the files for identity elements associated with the identity plate have been selected with a parameter file, the identity plate may be implemented in the application and an output model for the application, if indicated by a user, system, or the parameter file. In other examples, the above-described process may be varied and is not limited to the examples provided.

Figure 7:
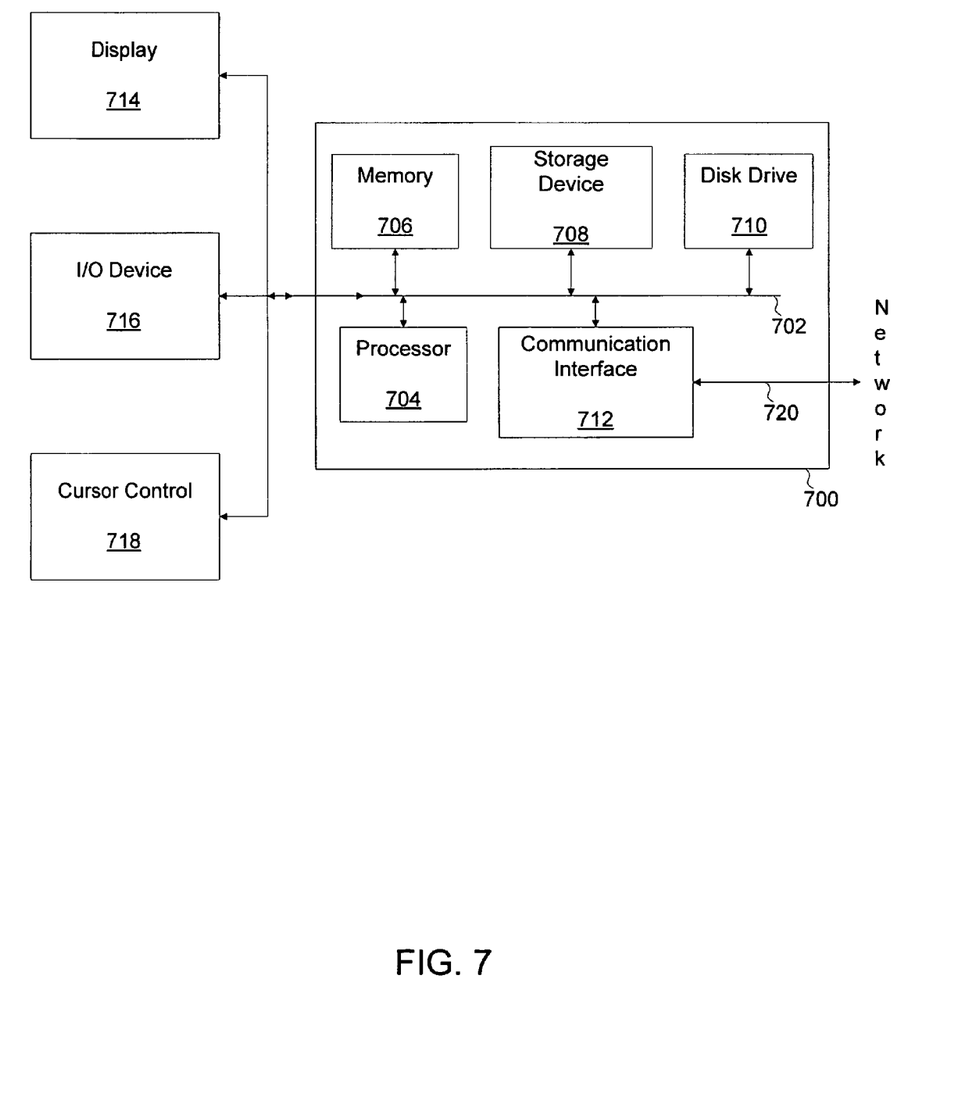
FIG. 7 illustrates an exemplary computer system suitable for identity plate implementation.

FIG. 7 illustrates an exemplary computer system suitable for identity plate configuration. In some examples, computer system 700 may be used to implement computer programs, applications, methods, processes, or other software to perform the above-described techniques. Computer system 700 includes a bus 702 or other communication mechanism for communicating information, which interconnects subsystems and devices, such as processor 704, system memory 706 (e.g., RAM), storage device 708 (e.g., ROM), disk drive 710 (e.g., magnetic or optical), communication interface 712 (e.g., modem or Ethernet card), display 714 (e.g., CRT or LCD), input device 716 (e.g., keyboard), and cursor control 718 (e.g., mouse or trackball).

According to some examples, computer system 700 performs specific operations by processor 704 executing one or more sequences of one or more instructions stored in system memory 706. Such instructions may be read into system memory 706 from another computer readable medium, such as static storage device 708 or disk drive 710. In some examples, hard-wired circuitry may be used in place of or in combination with software instructions for implementation.

The term "computer readable medium" refers to any medium that participates in providing instructions to processor 704 for execution. Such a medium may take many forms, including but not limited to, non-volatile media, volatile media, and transmission media. Non-volatile media includes, for example, optical or magnetic disks, such as disk drive 710. Volatile media includes dynamic memory, such as system memory 706. Transmission media includes coaxial cables, copper wire, and fiber optics, including wires that comprise bus 702. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions may be performed by a single computer system 700. According to some examples, two or more computer systems 700 coupled by communication link 720 (e.g., LAN, PSTN, or wireless network) may perform the sequence of instructions in coordination with one another. Computer system 700 may transmit and receive messages, data, and instructions, including program, i.e., application code, through communication link 720 and communication interface 712. Received program code may be executed by processor 704 as it is received, and/or stored in disk drive 710, or other non-volatile storage for later execution.

The foregoing examples have been described in some detail for purposes of clarity of understanding, but are not limited to the details provided. There are many alternative ways and techniques for implementation. The disclosed examples are illustrative and not restrictive.

What is claimed is:

1. A method, comprising:
    using identity data to configure one or more identity elements of an identity plate, the identity plate to be displayed in an application;
    determining a parameter for displaying the identity plate in the application;
    wherein the application is configured to display within an interface associated with the application one or more branding elements for the application's publisher; and
    presenting the identity plate within the interface associated with the application, the identity plate being configured to brand the interface by displaying the one or more identity elements in one or more positions within the interface and output generated by the application, wherein displaying the one or more identity elements replaces one or more of the one or more branding elements for the application's publisher.

2. The method recited in claim 1, wherein the application determines how to present the identity plate and the one or more identity elements.

3. The method recited in claim 1, wherein presenting the identity plate within the interface associated with the application is determined manually.

4. The method recited in claim 1, wherein the application determines a format associated with the identity plate, the format being used by the application to determine how to present the identity plate and the one or more identity elements.

5. The method recited in claim 1, wherein the identity plate is preset.

6. The method recited in claim 1, further comprising previewing the interface, wherein the application determines how to display the identity plate and the one or more identity elements.

7. The method recited in claim 1, wherein configuring the identity plate further comprises using a dialog box to enter a parameter associated with the one or more identity elements.

8. The method recited in claim 1, wherein configuring the identity plate further comprises using a menu to enter a parameter associated with the one or more identity elements.

9. The method recited in claim 1, wherein configuring the identity plate further comprises manipulating a graphical element in the interface, the graphical element being associated with one or more functions of the application.

10. The method recited in claim 1, wherein configuring the identity plate further comprises the application using a directory to locate a file, the file storing the identity data comprising the one or more identity elements.

11. The method recited in claim 1, wherein the identity plate is propagated to another application in data communication with the application.

12. The method recited in claim 11, wherein the another application is configured to display another interface, the another interface displaying the identity plate with content associated with the another interface.

13. The method recited in claim 12, wherein the another application is configured to print the identity plate with the content.

14. The method recited in claim 1, wherein the identity plate is used to replace branding of the application.

15. A system, comprising:
    a repository configured to store identity data associated with an application;
    wherein the application is configured to display within an interface associated with the application one or more branding elements for the application's publisher; and
    a module picker configured to import the identity data into the application, the identity data being used to configure one or more identity elements, to configure an identity plate using the one or more identity elements, and to present the identity plate within the interface associated with the application, the identity plate being configured to display the one or more identity elements in one or more associated positions configured to receive the one or more identity elements wherein at least one of the one or more associated positions in which the one or more identity elements are displayed replaces one or more of the one or more branding elements for the application's publisher.

16. The system recited in claim 15, wherein the application determines a format associated with the identity plate, the format being used by the application to determine how to present the identity plate and the one or more identity elements.

17. The system recited in claim 15, wherein the repository is configured to store the identity plate and the one or more identity elements.

18. The system recited in claim 15, wherein the module picker is configured to retrieve the identity plate, the one or more identity elements, and the identity data.

19. A system, comprising:
    a memory configured to store identity data, one or more identity elements, and an identity plate; and
    a processor configured to import the identity data into an application, the application being configured to display within an interface associated with the application one or more branding elements for the application's publisher, the identity data being used to configure the one or more identity elements and the identity plate using the one or more identity elements, and to present the identity plate within the interface associated with the application, the identity plate being configured to display the one or more identity elements in one or more associated positions configured to receive the one or more identity elements, wherein at least one of the one or more associated positions in which the one or more identity elements are displayed replaces one or more of the one or more branding elements for the application's publisher.

20. A computer program product stored in a computer readable storage medium and comprising computer instructions for:

importing identity data into an application, the identity data to be used to configure one or more identity elements;

configuring an identity plate using the one or more identity elements;

wherein the application is configured to display within an interface associated with the application one or more branding elements for the application's publisher; and presenting the identity plate within the interface associated with the application, the identity plate being configured to display the one or more identity elements in one or more associated positions configured to receive the one or more identity elements, wherein displaying the one or more identity elements replaces one or more of the one or more branding elements for the application's publisher.

* * * * *